M. B. GORDON.
AUTOMATIC FILM WINDING CAMERA.
APPLICATION FILED AUG. 9, 1919.

1,331,849.

Patented Feb. 24, 1920.

Myron B Gordon, Inventor
By his Attorney Phillips Abbott.

UNITED STATES PATENT OFFICE.

MYRON B. GORDON, OF WILKINSBURG, PENNSYLVANIA, ASSIGNOR TO ANSCO COMPANY, OF BINGHAMTON, NEW YORK, A CORPORATION OF NEW YORK.

AUTOMATIC FILM-WINDING CAMERA.

1,331,849.  Specification of Letters Patent.  Patented Feb. 24, 1920.

Application filed August 9, 1919. Serial No. 316,474.

*To all whom it may concern:*

Be it known that I, MYRON B. GORDON, a citizen of the United States, and a resident of the city of Wilkinsburg, county of Allegheny, and State of Pennsylvania, have invented a certain new and useful Improvement in Automatic Film-Winding Cameras, of which the following is a specification, reference being had to the accompanying drawings.

The object of this invention is to provide means whereby the film in a camera of the class stated may be successively advanced from exposure to exposure in response to the closing of the shutter, irrespective of whether the shutter be adjusted for snap, bulb or time exposure, and also means for preventing the shutter from being opened until the film has been so advanced. Although my invention is applicable for use in conjunction with a large variety of cameras of the class stated, yet, since it is peculiarly beneficial when used in conjunction with a camera provided with the devices set forth in my application for patent for improvement in automatic film winding cameras filed concurrently herewith and designated Serial No. 316,473, filed August 9, 1919, I have so illustrated it herein and I refer to my said application for a more ample understanding of the construction and its method of operation.

Figure 1:
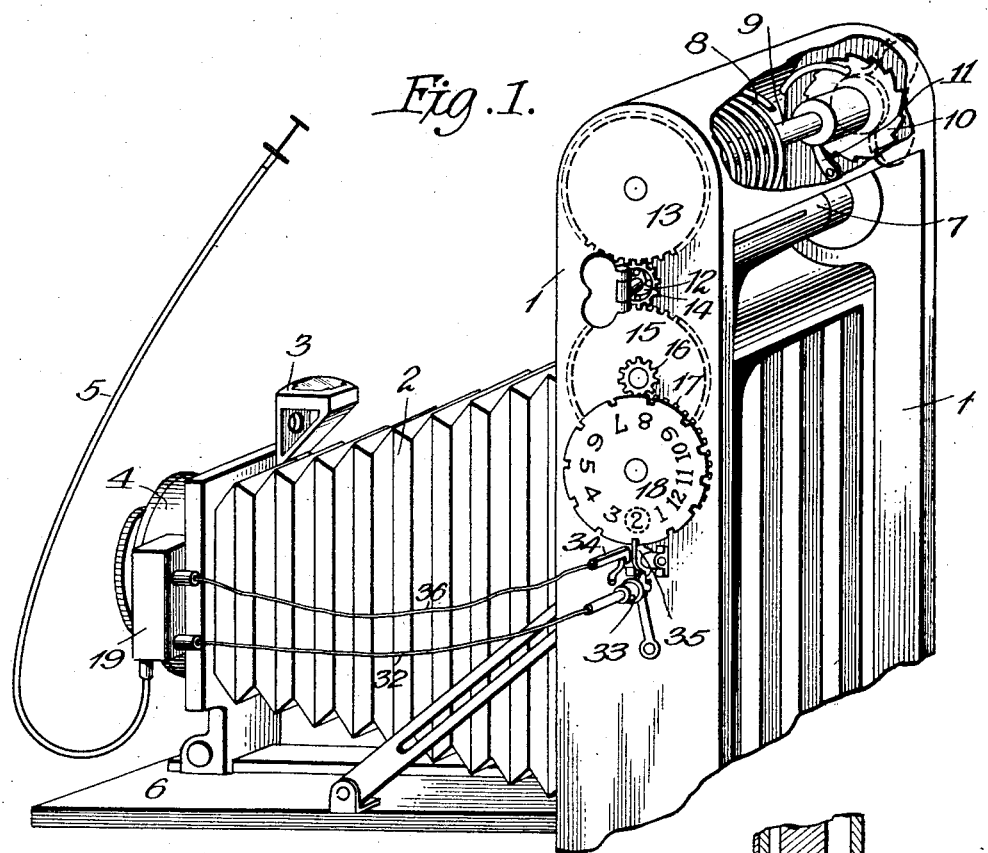
Figure 2:
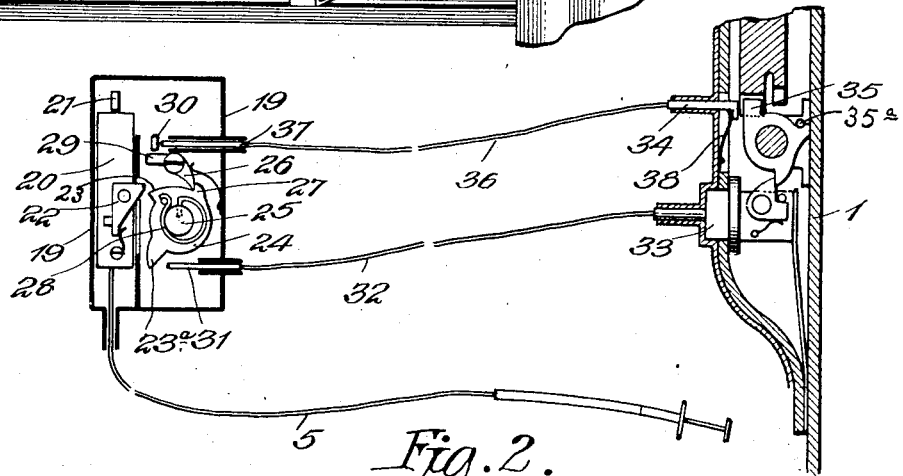

Referring to the drawings, Figure 1 is a perspective view, parts being broken away, of a camera embodying the invention and such parts of the invention of my said application as will aid in an understanding hereof; Fig. 2 is a vertical sectional view of a camera embodying the invention, the interior parts adjoining the shutter casing being shown in elevation.

In the drawings 1 represents the camera box, 2 the ordinary extension bellows, 3 the finder, 4 the shutter casing, 5 the actuating device for the shutter, 6 the ordinary dropfront, 7 the receiving spool, 8 the spring motor, 9 the shaft for the spring motor, 10 the ratchet wheel, 11 the pawl therefor, 12 the clutch, 13, 14, 15, 16 and 17 a train of gearing actuated by the motor, 18 a notched disk fastened on the gear 17 and bearing numerals corresponding to the exposures on the film. All of the foregoing parts are preferably as set forth in my said concurrently filed application, but other suitable parts both in construction and method of operation may be substituted therefor.

Referring now to the devices more particularly embraced in this invention, attached to the side of the shutter casing 4 is a small chamber 19, and the shutter actuating device 5 passing into this chamber engages with, and when actuated, elevates a plunger 20, which trips or opens the shutter, not shown, by moving upwardly a lever 21, which forms part of the shutter mechanism in any well known manner. A spring actuated pawl 22 pivotally mounted on the plunger 20, as shown, engages, when in its lowermost position, a detent 23 on a pivoted part 24, which I call a striker and which, as shown, is provided with a retractile spring 28, and as the plunger 20 rises it turns the striker about its pivot 25, putting the spring 28 under tension, until as the plunger reaches its highest position, the pawl 22 will have slipped off from the detent 23 on the striker 24. Meantime another pawl 26 drops behind a stop 27 on the striker 24 before the pawl 22 has slipped past the detent 23, thus releasing the striker 24, so that the pawl 26 will hold the striker in the position shown against the stress of the striker spring 28, which, as stated, tends to return the striker 24 to its original position. Projecting from the pawl 26 is a stem 29 which is adapted to be struck by a lever 30 which is so connected to the shutter mechanism that it drops under the action of gravity or of suitable springs or weights, not shown, when the shutter closes, and the shock of its impact against the stem 29 will trip the pawl 26, thus releasing the striker 24, the detent 23ª of which in its return to normal position under the action of the spring 28, strikes a plunger 31, which, as shown, is connected by a suitable push rod 32 to the button 33 of the releasing mechanism illustrated in Fig. 1. This causes the film to be shifted in response to the closing of the shutter.

The devices which prevent the shutter from being opened again until the film has been advanced are as follows: A plunger 34 is adapted to be struck by the stop 35 when the latter is disengaged from the notched disk 18 for the release of the film advancing mechanism, and this plunger 34 is connected by a suitable push rod 36 with another plunger 37 located as shown in the chamber 19 and when, as stated, the lever 30 falls by gravity or otherwise upon the closing of the shutter and strikes the projecting stem 29 of the pawl 26, thus disengaging it from the striker 24, the film controlling bottom 33 is depressed and the stop 35 moved from engagement with the notch in the disk 18, thus advancing the film, and this movement of the stop 35 actuates the plunger 37, which will be pushed inwardly over the lever 30 when depressed so that the inner end of the plunger will overlap the lever and thus the shutter be prevented from opening until the stop 35, being actuated by its spring 35$^a$, as set forth more fully in my said application, Serial No. 316,473, again falls into a notch upon the disk 18, whereupon a spring 38 will again return the plungers 34 and 37 to their normal or primary position and the lever 30 thereupon rising the shutter may again be actuated.

It will be obvious to those who are familiar with such matters that the devices in their construction and method of co-active arrangement as herein described and illustrated constitute one form only in which the invention may be embodied and also that if the weight of the parts, as, for example, the gravity actuated lever 30, be not sufficient to assure their operation, or if any other parts owing to their delicacy require positive actuation, any well known mechanical devices may be employed to assure greater certainty in function, as, for example, increasing the weight of the part, the employment of springs, etc. I therefore do not limit myself to the details illustrated and described.

I claim:

1. The combination with a film roll camera provided with means for the automatic advance of the film, of a chamber adjoining the shutter mechanism, a plunger therein, means for actuating the plunger, a shutter actuating lever actuated by the movement of the plunger, a striker, a spring therefor, means on the plunger which engage the striker during the movement of the plunger and put the striker spring under tension, means for the release of the striker, and a plunger engaged by the striker when released, whereby the film advancing mechanism will be automatically caused to operate.

2. The combination with a film roll camera provided with means for the automatic advance of the film, of a chamber adjoining the shutter mechanism, a plunger therein, means for actuating the plunger, a shutter actuating lever actuated by the movement of the plunger, a striker, a spring therefor, means on the plunger which engage the striker during the movement of the plunger and put the striker spring under tension, means for the release of the striker, a pawl to hold the striker in its then position when released, a gravity actuated lever adapted to trip said pawl, and means actuated by the release of the film advancing mechanism which controls the position of said gravity acting lever.

In testimony whereof I have signed my name to this specification.

MYRON B. GORDON.